United States Patent
Emmerink et al.

(10) Patent No.: US 8,040,879 B1
(45) Date of Patent: Oct. 18, 2011

(54) COMMUNICATION SYSTEM

(75) Inventors: Antonius Emmerink, Munich (DE); Egon Klein, Gemering (DE); Andreas Steffan, Munich (DE); Rainer Windecker, Munich (DE); Steffi Winkler, Gauting (DE)

(73) Assignee: Siemens Aktiengesellschaft, Munich (DE)

( * ) Notice: Subject to any disclaimer, the term of this patent is extended or adjusted under 35 U.S.C. 154(b) by 3456 days.

(21) Appl. No.: 10/088,682

(22) PCT Filed: Sep. 14, 2000

(86) PCT No.: PCT/DE00/03207
§ 371 (c)(1),
(2), (4) Date: Jul. 9, 2002

(87) PCT Pub. No.: WO01/22769
PCT Pub. Date: Mar. 29, 2001

(30) Foreign Application Priority Data

Sep. 21, 1999 (DE) .................................. 199 45 154

(51) Int. Cl.
*H04L 12/66* (2006.01)

(52) U.S. Cl. ...................................................... 370/355
(58) Field of Classification Search .................. None
See application file for complete search history.

(56) References Cited

U.S. PATENT DOCUMENTS 6,731,628 B1 * 5/2004 Shiomoto et al. ............. 370/355
6,757,823 B1 * 6/2004 Rao et al. ....................... 713/153

FOREIGN PATENT DOCUMENTS

| | | |
|---|---|---|
| DE | 39 31 511 | 4/1990 |
| DE | 44 17 777 | 11/1995 |
| EP | 0 335 555 | 10/1989 |
| EP | 0 939 576 | 9/1999 |
| JP | 11163942 | 6/1999 |
| WO | WO 97/16007 | 5/1997 |

OTHER PUBLICATIONS

Lakshmi-Ratan "The Lucent Technologies Softswitch—Realizing the Promise of Convergence" Bell Labs Technical Journal, Apr.-Jun. 1999: XP000851517 (22 pages).

* cited by examiner

*Primary Examiner* — Raj K Jain
(74) *Attorney, Agent, or Firm* — King & Spalding L.L.P.

(57) ABSTRACT

A method and an arrangement are provided for actuating and operating a heterogeneous transport network which includes connection elements, such as ATM and Ethernet connections, by controlling a TDM-based switching system. In the area of the transport network, there are gateways and routers which are actuated by the central control device for the purposes of setting up and clearing down a connection. Information relating to the accessibility of specific communications subscribers by a communication medium and communications protocol is either stored in the area of a central control mechanism or is available locally in the area of local access devices for subscriber terminals.

21 Claims, 7 Drawing Sheets

COMMUNICATION SYSTEM

CLAIM FOR PRIORITY

This application claims priority to International Application No. PCT/DE00/03207 which was published in the German language on Sep. 14, 2000.

TECHNICAL FIELD OF THE INVENTION

The invention relates to a method and an arrangement for setting up and clearing down, and sustaining, communications links, and in particular, within the context of a private branch exchange and terminals which are to be connected.

BACKGROUND OF THE INVENTION

The rising volume of communication, as a result of an increasing number of communications subscribers and rising demands on the volume of data to be transmitted, places greater and greater demands on switching centers, in particular on private branch exchanges, with regard to the volume of data to be transmitted for each communications link and the number of communications terminals which are to be connected to one another.

Current devices are based, by way of example, on the TDM method (Time Division Multiplexing), in which communications data on different connections are transmitted in respectively defined timeslots. A connection between different communication parties is set up by a switching matrix which assigns incoming timeslots on an incoming connection outgoing timeslots to an outgoing connection on the basis of a control information item. Such switching matrices are generally of fixed proportions and can set up only a defined number of connections, which often makes it difficult to match exchanges to requirements. Another problem with such devices is that the timeslots are able to hold only a limited amount of data.

On account of different strengths and weaknesses of networks when transporting voice and data in the local domain, various communications networks have become established for specific purposes of use.

FIG. 1 shows an example of a known private branch exchange 150 with two peripheral devices P1 and P2 to which a communications terminal KE1 and KE2 operating on a digital or analog basis is respectively connected. These peripheral devices P1 and P2 are accommodated in the same physical area as the central device ZE1. By way of example, they are in the same room or in the same cabinet as it. The terminals occupy defined timeslots in the PCM data stream (Pulse Code Modulation) with communication data. The digital or analog communications terminals KE1 and KE2 are respectively connected to subscriber line modules SLMO1 and SLMO2 which supply or take digital data, intended for the respective terminals or coming from the respective terminals, to/from the PCM data stream using timeslots stipulated by signaling. These PCM data streams are denoted by 100 and 200 in FIG. 1. In addition, signaling connections are shown which are represented by 110 and 210. It should be noted that these involve a logical representation and not a physical representation. In reality, however, the transport data and the signaling data are transmitted in the same connecting cable.

This figure also shows peripheral devices P1 and P2 and supply modules LTUC1 and LTUC2 which regulate the data traffic to the subscriber line modules of the respective peripheral devices. The peripheral device P1 is supplied with signaling data via the line 110, and the peripheral device P2 is supplied with signaling data via the signaling line 210.

As can clearly be seen here, this arrangement involves both the information to be transported and the signaling information being supplied to a central device ZE1. In this context, a messaging device DCL collects and distributes messages 2 which are interchanged between the central device ZE1 and the peripheral devices P1, P2. The call processing section CP controls the setup and clear-down of connections and, to this end, uses equipment-specific interface functions DH, inter alia, which are in the form of program modules, for example. This involves producing setting instructions 1 for the switching matrix MTS. These setting instructions essentially indicate which input of the switching matrix is to be connected to which output in order to provide a communications link. Control and connection functions are thus performed by a single physically incorporated functional unit in the communications network.

Problems arise with such configurations because the data to be transported need to be supplied to the central device ZE1. This is the case even if, by way of example, two communications terminals which are connected to the same peripheral device P1 need to communicate with one another. The wiring complexity required for such devices increases with increasing distance between the terminals and the central device ZE1, which means that this type of arrangement restricts the extent of a private branch exchange or makes installation much more expensive when covering relatively large areas.

In such devices, problems likewise arise with regard to modular extendibility both in terms of the number of connections and in terms of the volume of data to be transmitted. This type of embodiment does not allow different data rates for each individual communications link.

Alignment and/or transparent integration of different network infrastructures is likewise not possible.

SUMMARY OF THE INVENTION

The invention specifies a method and an arrangement for providing a communications link which ensure a high level of flexibility in terms of matching to network infrastructures and in terms of the physical extent thereof.

One advantage of the invention is the operation of a heterogeneous communications network using a joint control mechanism, because information about the type of protocol which can be used to reach respective subscribers is held in the area of the central control mechanism, or in the transport network. Advantageously, the topology of the transport network can differ from that of the control network in this context. This makes it possible to set up a communications link while avoiding numerous diverse conversion procedures which would be necessary on a previously stipulated path between the subscribers. This advantageously takes account of the fact that the subscribers communicate using different communications protocols, with local matching to the required communications protocol, as opposed to central matching, allowing the communications path to be routed via a minimal number of conversion devices, which protects the resources in the network and keeps down the length of the communications paths in the transport network.

In one embodiment of the invention, the method described provides not only the protocol information item but also a media information item relating to the transport network, because this makes it possible to take into account the characteristic of different transmission media in terms of transport quality, utilization and speed when controlling the connection setup.

In another embodiment of the invention, the method described allows the different protocol structure of communications protocols handled on a single medium or on different media to be taken into account by actuating suitable protocol conversion units, associated with communications subscribers which are involved, in an appropriately defined manner when setting up and sustaining the connection.

In still another embodiment of the invention, the method described allows a defined media access device to be actuated for a particular communications subscriber. If a plurality of transport media are available for each communications subscriber, this advantageously allows them to be specifically taken into account and actuated when a connection is set up.

In another embodiment of the invention, the method described allows the information required for controlling the transport network to be set up and/or provided centrally, because the problem of updating, maintaining and saving these data is then limited to the maintenance of a central database.

Advantageously, one aspect of the method described affords the opportunity for required control information to be provided locally in the transport network and for the control mechanism to request it when a connection is set up, because this allows local measures for aligning the transport network to be taken without such measures affecting the entire transport network and a central control mechanism.

Advantageously, in another aspect of the method described, in which the transport network provided is a network to which information is transmitted on the basis of the Internet Protocol, a local device is controlled by assigning to an IP address precisely one PCM data-stream subscriber line and an entire local device, because this allows IP subscribers to be managed and controlled using control mechanisms which likewise actuate TDM-based communications devices, without the additional need for a high level of development complexity in order to match these devices to IP-based terminals. This allows existing conventional telephone installations also to be used for IP telephony, for example, where conventional telephone installations provide a large quantity of service features, or else makes it possible to control data links to a telephone installation and thus to enhance them with service features.

One advantage of the method described is that the setup of a direct connection between communications terminals relieves the burden on transport-network-specific devices, such as the local switching centers and the conversion devices required for the otherwise necessary data conversion. This makes it possible to increase the performance of the transport network.

In another embodiment of the invention, there is an arrangement for setting up/clearing down and/or sustaining a communications link has means which output at least two control information items to two local devices in the transport network if at least one connection element between these local devices is affected, because this provides a configuration for controlling heterogeneous transport networks which involves transmitting connection information, which is suitable for controlling TDM links, together with the required protocol information item to the local devices affected by the connection setup/clear-down and/or sustenance. Particularly advantageously, one such arrangement likewise allows operation of a mixed infrastructure comprising TDM-based switching centers and IP-based local area networks.

In another embodiment of the invention, there is an arrangement having a central control device which provides transport-network-specific media information or protocol information and makes it available for connection setup. This ensures, in connection with an existing TDM-based communications infrastructure, that the available central database, possibly service feature implementation and application interface, can continue to be used and need be extended only by the protocol- and media-specific information for operating mixed infrastructures.

Compared with the central solution, local provision of the complementary control information required has the advantage that configuration changes affect local areas of local devices and not the entire transport network, which means that a more flexible device is produced in which the respective current stock of control information is requested for connection setup before central control of the transport network when a connection is being set up.

In one aspect of the arrangement, there is a gateway for converting a TDM protocol into the Internet Protocol, because such a gateway can connect TDM-based units to a transport network on which the Internet Protocol is handled.

In another aspect of the arrangement, there is a checking device for checking protocol-specific information for the address of a local device, because this makes it possible to ensure that there is no need for a procedure for converting the communication data into transport-network-specific communication data for communications links between communications terminals associated with a single local device. Advantageously, there is therefore no delay as a result of conversion and no loss of data as a result of conversion methods which may not be loss free.

In still another aspect of the arrangement, there is a mechanism which can produce a short circuit within a TDM data stream between two subscribers to be connected, because this allows internal communications links to be set up in a technically elegant fashion without using the local switching center and the conversion device.

Advantageously, an internal connection is set up, in one embodiment of the arrangement described, by interchanging the reading and writing directions of timeslots in a TDM data stream, because this allows a communications link to be produced within a local device in a technically most simple manner.

Advantageously, one embodiment of the arrangement described has an Ethernet access facility, because such a network access facility allows a terminal to access the Ethernet. Such network access cards are available on the market and are a simple and inexpensive solution for producing mixed transport networks with connection elements via the Ethernet.

Particularly advantageously, the devices provided for heterogeneous network operation in local devices are incorporated in specific terminals, because such a terminal can be controlled by a TDM-based control mechanism, customary to date, with equipment-specific stipulation of a single TDM data stream in connection with a single subscriber line and a subscriber line module without any great complexity for aligning control mechanism customary to date.

One particular advantage is that in one embodiment of such arrangements, telephones and personal computers are provided as terminals, because these are the terminals which are used most frequently and direct connection of these units to the Ethernet for voice communication represents great additional benefit for terminal users if they can be operated by a central control mechanism in conjunction with conventional devices.

BRIEF DESCRIPTION OF THE DRAWINGS

Exemplary embodiments of the invention are explained in more detail below with reference to figures.

DETAILED DESCRIPTION OF THE PREFERRED EMBODIMENTS

Figure 2:
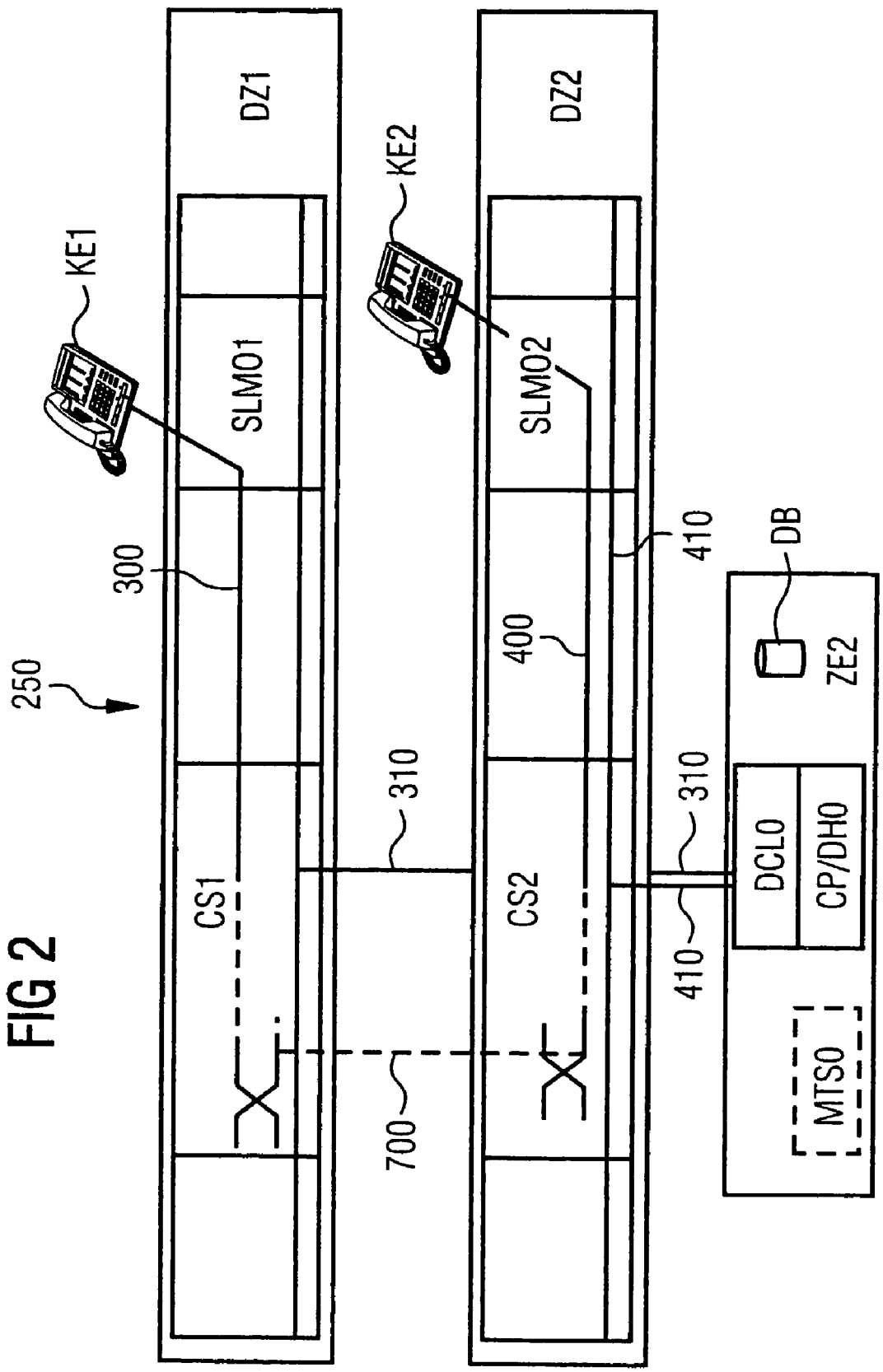
FIG. 2 shows an example of a novel communications arrangement.

FIG. 2 shows an example of a flexible arrangement for setting up communications links. By way of example, this arrangement illustrates the structure of a private branch exchange 250.

Figure 1:
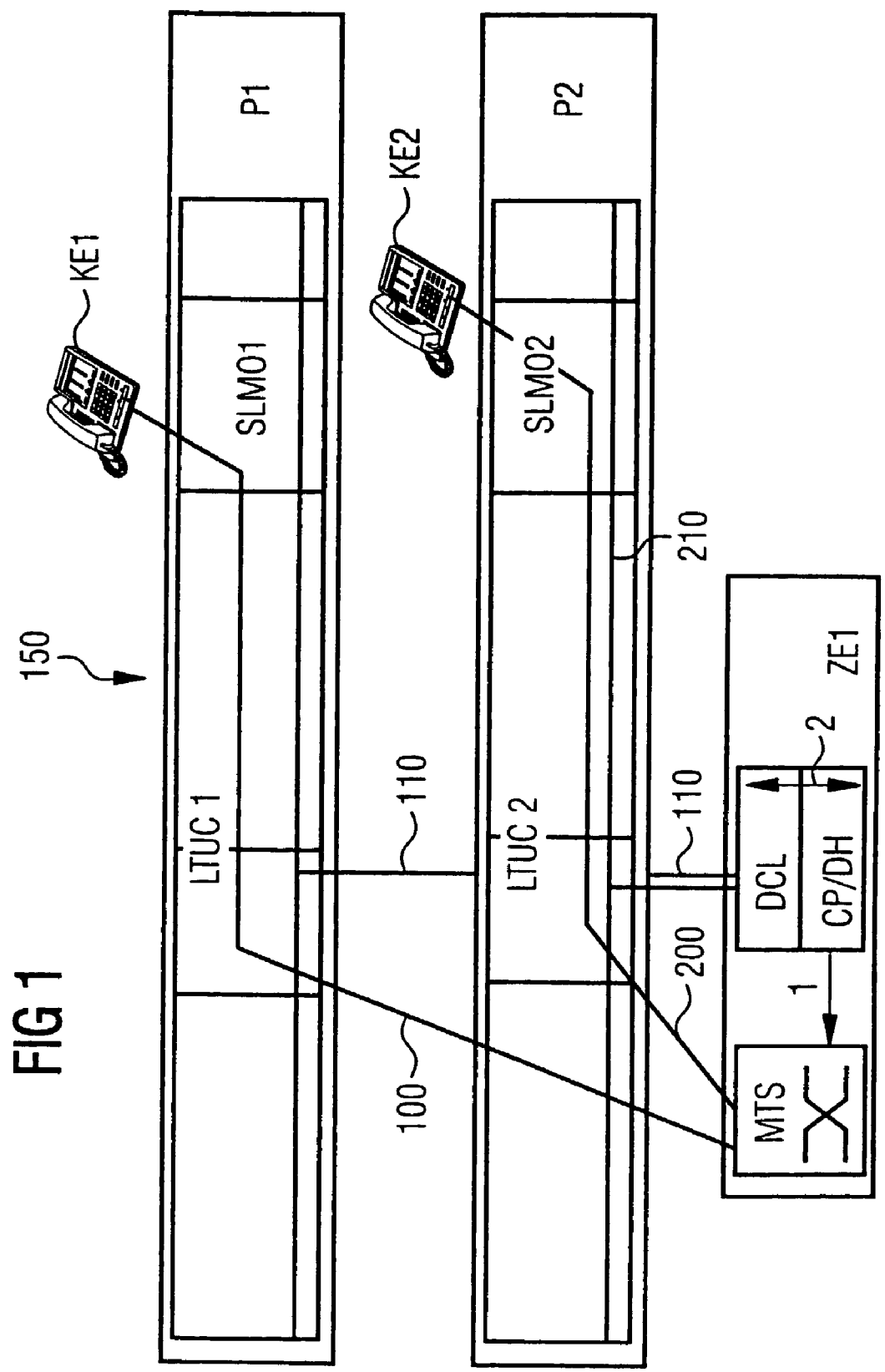
FIG. 1 shows a conventional communications arrangement.

Equivalent reference symbols in FIG. 2 denote the same elements of the device as in FIG. 1. Looking at FIG. 2, it is immediately noticeable that the transport of communication data is triggered by the message traffic of the control messages. To this end, a separate transport network 700 and a separate control network 310/410 are provided in this case. This design of an exchange has the advantage that any already existing networks, such as public or private voice and data networks, can be used for the transport network. Only the control network needs to be routed to the central device ZE2 in this case. The use of conversion devices, such as gateways, advantageously makes it possible to operate and control any hybrid configurations.

Figure 5:
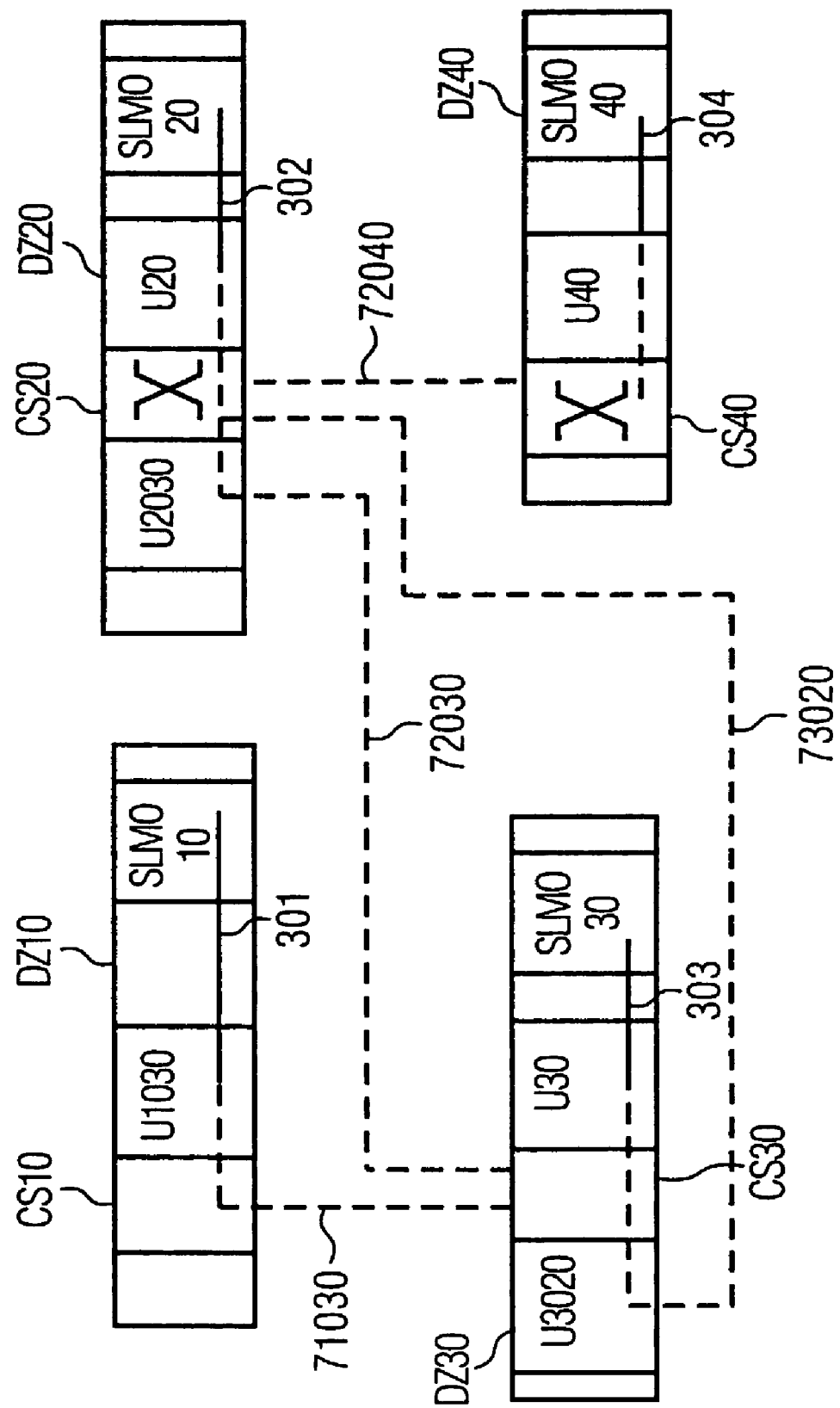
FIG. 5 shows a communications infrastructure in which different communications protocols are used on connection element links.
Figure 6:
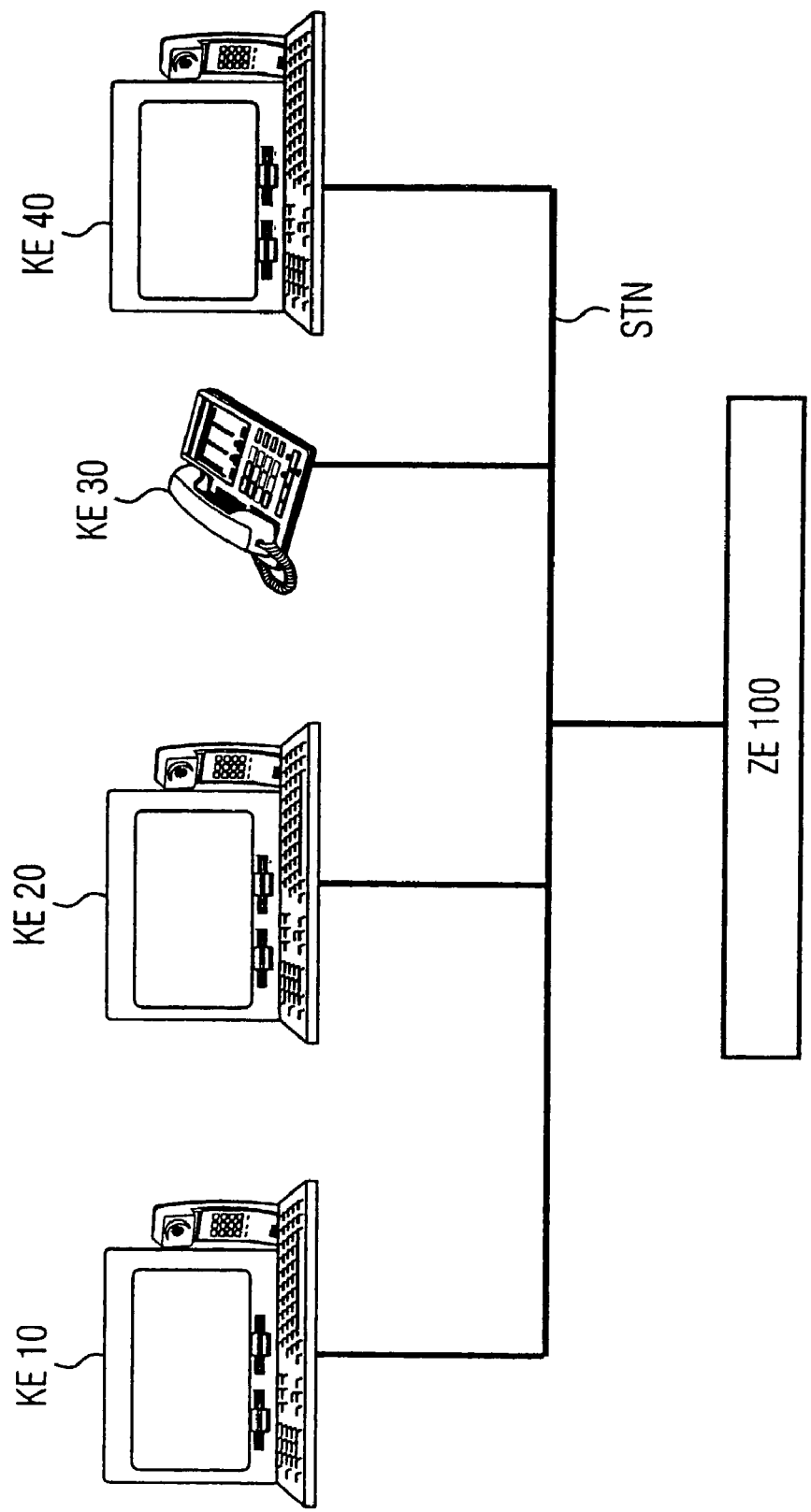
FIG. 6 shows a communications infrastructure using IP-based terminals.

The digital or analog communications terminals KE1 and KE2 are in this case shown such that they are respectively connected to subscriber line modules SLMO1 and SLMO2. Without limiting the invention, however, such an arrangement 250 can also involve and incorporate terminals which can be connected to the transport network 700 directly, with bypassing or without an SLMO. It is also possible to connect ATM terminals or else IP-based (Internet Protocol) terminals. One example of a possible hybrid configuration is shown in FIG. 5 and is explained in the associated part of the description. Directly connected terminals are shown in FIG. 6 and are described by the associated part of the description of the figures.

As will also be recognized, the local devices DZ1 and DZ2 each have local switching centers CS1 and CS2 which, by way of example, can be in the form of Ethernet or ATM access devices.

In the case of mixed transport networks, gateways and routers and also media of any type can be connected to one another as required. The illustration likewise shows that the switching matrix MTS0 is no longer used for connection tasks. Instead, the transport network performs the connection tasks.

In the present arrangement, the control lines 410 and 310 are used to provide at least one respective control information item for the respective local switching centers CS1 and CS2 for the purposes of setting up the communications link, the control information item being derived from a timeslot-based control information item. The information is interchanged using messages. In addition, the figure shows that PCM data are converted into cell data according to the standard of the transport network type 700, such as ATM cell data, on a data link 300 or 400. In this context, it should be noted that the use of an ATM network as transport network serves as an exemplary embodiment. Ethernet networks, other IP connections or even TDM connections are likewise suitable. The selection is dependent on the intended purpose of use and extends to the whole range of available networks and also optical media, both in the narrowband range and in the broadband range.

If appropriate, various transport networks can be provided; in that case, gateways secure the link between the various network sections.

Preferably, the local switching centers CS1 and CS2 perform transport-network-dependent call processing, although this is essentially limited to a basic call functionality. Service features are implemented and provided by the central control mechanism ZE2. Connections between the different local devices are controlled by the central device ZE2 using signaling messages. The advantages of this arrangement are that it has both narrowband capability and broadband capability. It allows the integration of any network types and topologies. In addition, the transport network can be set up both on public networks and on private networks, or else can comprise a mixture. It is advantageously possible for local devices at a distance without physical limitation to be associated with the central device ZE2, so that powerful devices with a large physical extent can also be provided by such a private branch exchange. The retention of a joint control mechanism means that it is possible to continue to use already existing software with minimal changes. One advantage of such a device 250 over a networked system comprising devices 150 is that the distributed system is a single installation (which is why it is likewise possible to operate service features and applications which are implemented only on an installation-wide basis), because it presents itself as a single installation from an application point of view. This removes the need for conversion of these methods in order to allow them to operate on a network.

Figure 3:
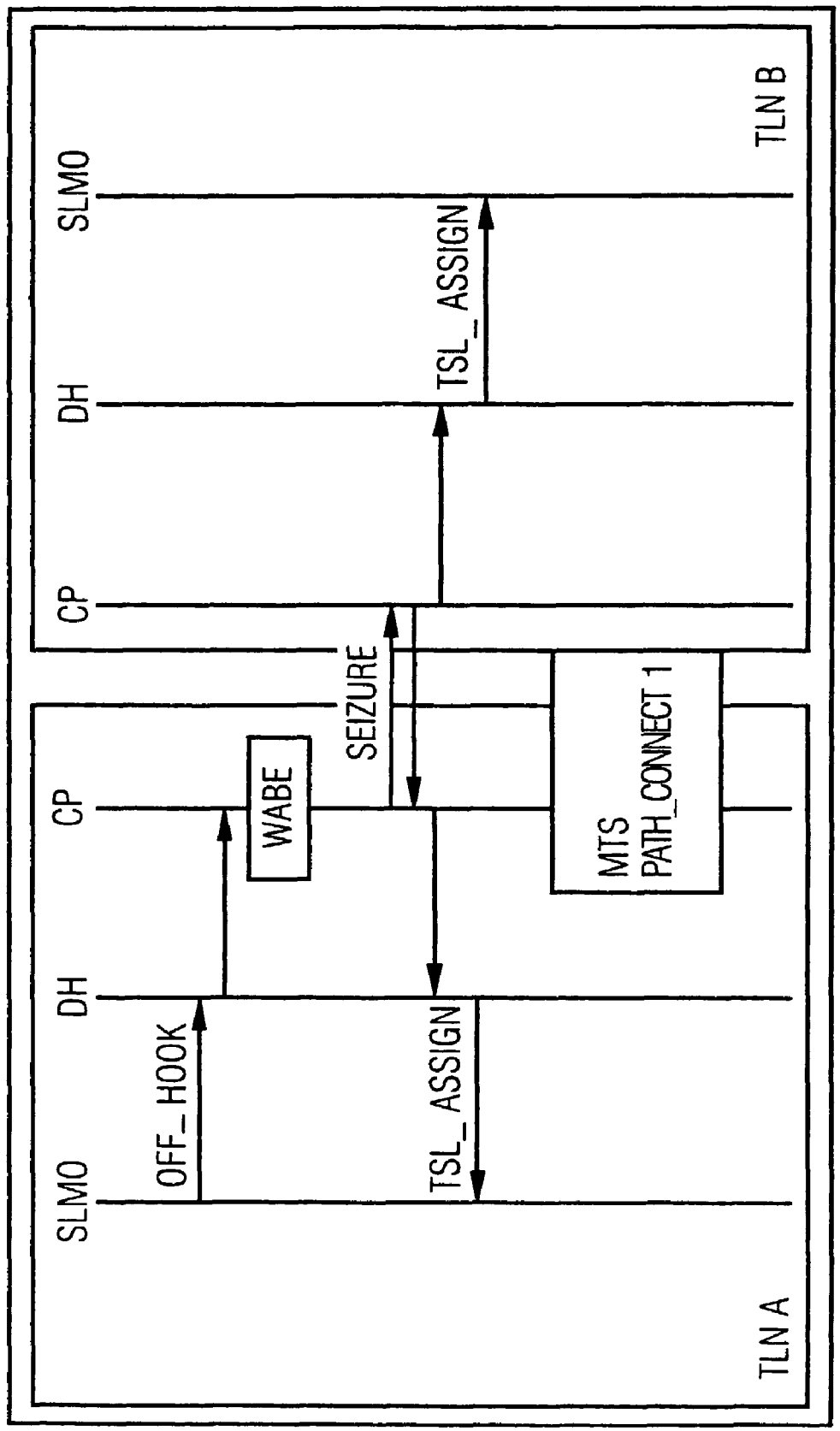
FIG. 3 shows an example of a message flow in a known switching system.

FIG. 3 shows, in simplified form, an example of a message flow for connection control in a conventional communications system for setting up a connection between two peripheral devices to which the terminal of a subscriber A, TLNA, and the terminal of a subscriber B, TLNB, are connected. The time sequence for the messages, or control messages, is shown from top to bottom. First, the subscriber A goes off-hook and generates the signaling information OFF HOOK. Next, the communication party required is dialed by entering selection information which is forwarded by an equipment-specific interface module DH to the call processing section CP for the subscriber A.

The selection code analysis WABE for the selection information results in a message SEIZURE being forwarded to the call processing section CP for the subscriber B. An equipment-specific interface module DH which is responsible at that point assigns the connection an explicit timeslot, for example ZS1, for a defined PCM data link, for example PD1, and generates the control message TSL_ASSIGN for the subscriber line module SLMO1. This control message sends the subscriber line module SLMO1 the explicit timeslot ZS1 and the stipulated PCM data link PD1 which are to be used for the connection. The explicit timeslot ZS1 for the PCM data link PD1 transports communication data on the connection element between subscriber line module SLMO1 and MTS. A second explicit timeslot ZS2 for a second explicitly stipulated PCM data link PD2 is needed for the connection element between MTS and subscriber line module SLMO2. The control information ZS2 and PD2 is communicated to the subscriber line module SLMO2, again using a control message TSL ASSIGN.

For physically connecting individual subscribers, TDM-based private branch exchanges use a TDM switching matrix MTS. For this switching matrix, a setting instruction PATH_CONNECT1 is transmitted which causes the timeslot ZS1 for PCM data link PD1 to be connected to the timeslot ZS2 for the PCM data link PD2. This means that the two connection elements are connected to form a continuous link between SLMO1 and SLMO2.

To carry out the method, it does not matter whether CP and DH are part of the control software and whether they are in the form of individual modules or in integrated form.

Figure 4:
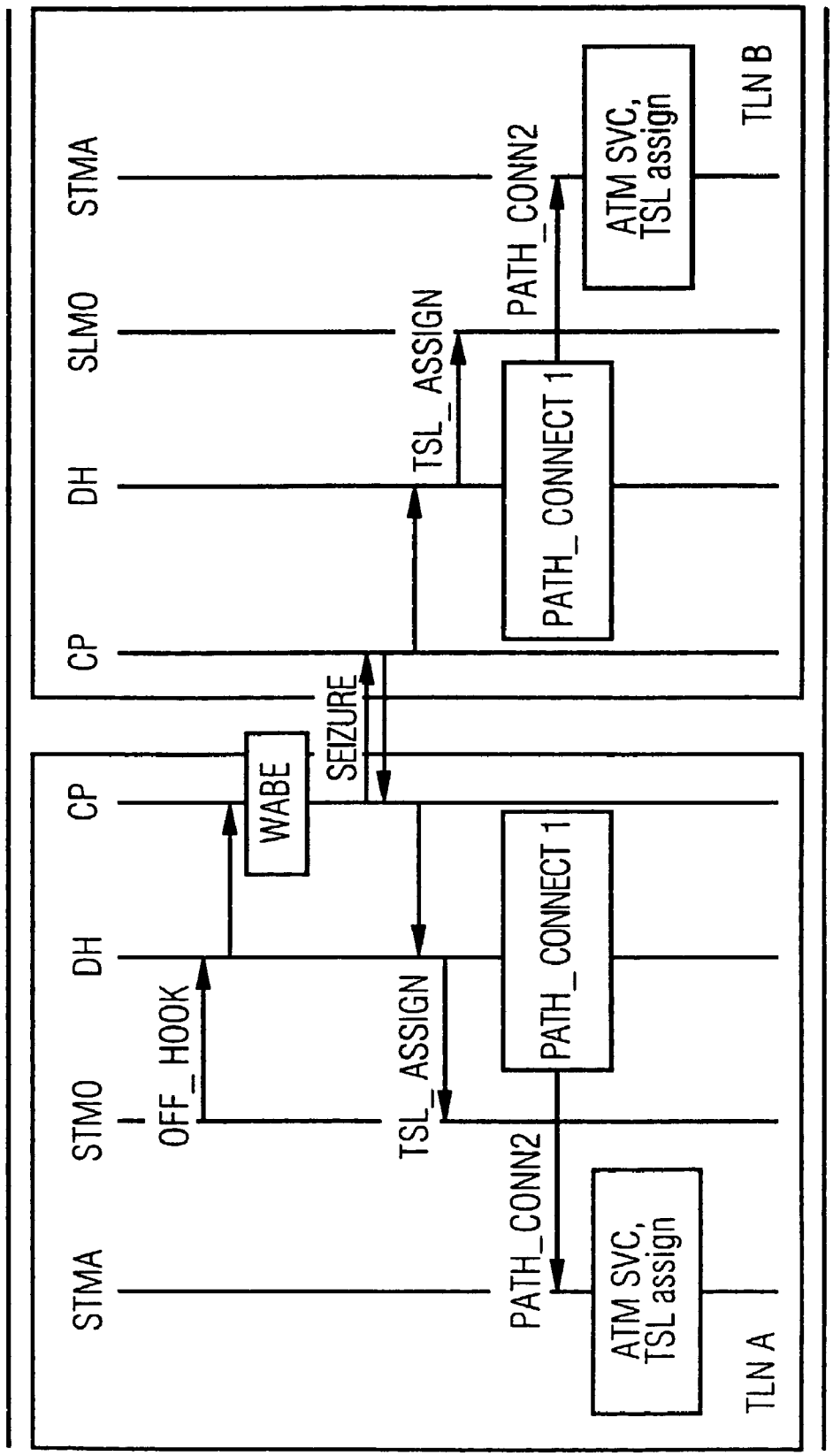
FIG. 4 shows an example of a message flow using timeslot-based connection information for the transport network.

FIG. 4 shows, in simplified form, an example of a message flow between two local devices, for the purposes of connection control. Connected to these devices are the terminal of a subscriber A, TLNA, and the terminal of a subscriber B, TLNB. The transport network used in this case is, by way of example, an ATM network. The time sequence for the messages is again shown from top to bottom.

A functional unit STMA, as gateway, converts the timeslots for the PCM data stream into a cell stream of ATM cells. In the exemplary embodiment shown in FIG. 2, the conversion device is respectively incorporated in the local switching center CS1 or CS2 and is therefore not shown separately.

The message flow differs from the flow shown in figure after the point at which the setting instruction PATH_CONNECT1 is transmitted for the TDM switching matrix. Instead of a setting instruction PATH_CONNECT1, this embodiment involves the generation of a control message PATH_CONN2 which is sent to the local switching centers. These then set up a connection in the transport network. When an ATM transport network is used, an ATMSVC is set up (ATM Switched Virtual Connection), for example using stipulated ATM signaling methods.

To this end, the control message PATH_CONN2 includes the timeslot information and data link information ZS and PD, which can be taken directly from the setting message PATH_CONNECT1, for example. In addition, the central control device needs to indicate the transport-network-dependent address of the local switching center to which the connection is to be set up. That is to say that the data which need to be provided for the central control mechanism as information relating to the transport network are limited to the transport-network-dependent addresses for the respective local switching centers. The central control device again ascertains the necessary addresses from the timeslot information and data link information ZS and PD. Association tables in a central database DB control the mapping of timeslot/data link to local switching center.

This principle is also suitable for controlling heterogeneous transport networks. It may be necessary additionally to store the network type and the available gateway at the same time.

The control message PATH_CONN2 can also include other information, and this can also be generated in a plurality of more specific forms. If connections having different bandwidths need to be set up, it can include information about the required bandwidth. Alternatively, the bandwidth information can also be interchanged directly between subscriber line module and switching center.

When the local switching centers have set up a connection in the transport network 700 after receiving the PATH_CONN2 message, the connection is used to transmit the user data. The user data stream on the data link 300/400 between subscriber line module and local device DZ is assigned to a connection between DZ1 and DZ2 by mapping timeslot indication ZS and PD for the connection identifier for the connection.

This means that, despite the possibly complicated flows when setting up a connection via the transport network, the central control mechanism ZE2 need forward only these addresses to the call processing section of the transport network in order to set up a connection there. The rest is handled by the transport-network-specific call processing section.

On the basis of this message flow, the PATH_CONNECT instruction is thus replaced by transport-network-specific call processing. To be able to connect TDM-based subscribers independently of transport network using local switching centers, it is necessary to convert timeslots into transport units. This is done in a conversion unit, such as STMA, of which there is at least one, preferably looped into the path of the user data, for each local device. For this purpose, an ATM-PCM gateway, an IP-PCM gateway or another required gateway can be provided.

However, the method described is not limited to dialup connections which are set up dynamically, but can also be used for an ATMPVC (ATMPVC Permanent virtual connection). The information relating to the address may then need to be complemented by information which regulates the use of permanent connections. In addition, other forms of data transmission can also be used, such as IP connections or FDDI (Fiber Distributed Data Interface), etc.

FIG. 5 shows as an exemplary embodiment a communications arrangement in which local devices DZ are connected to one another by a heterogeneous transport network, the connections in this transport network being distinguished in that connection elements are produced using different communications media or by handling different communications protocols on these connection elements.

Like the arrangement shown and described in FIG. 2, this mixed communications system is also controlled by a central control device, with control messages being transmitted by the central control mechanism and being sent to the local switching centers CS in order to set up a connection and to sustain or clear down the connection. In this case too, message interchange is effected via a control network, although this control network is not shown to preserve the clarity of the illustration. The reference symbols in the figure can be interpreted in the same way as the reference symbols in the description of the other figures. Unless explicitly mentioned otherwise, functional elements with the same name in the figure also have the same scope of functions in this case.

Specifically, the figure shows local devices DZ10 to DZ40 which have subscriber line modules for communications terminals SLMD10 to SLMD40 (not shown). In addition, conversion devices U are provided in the respective local devices DZ, which carry out media alignment or protocol alignment among the different connection element links.

In addition, local switching centers CS10 to CS40 are shown. The conversion devices and the subscriber line modules SLMD have TDM data links 301 to 304 between them. Specifically, the local devices DZ have the connection element links 71030, 72030, 72040 and 73020 between them. The connections 72040 and 73020 are, by way of example, transport network connection elements based on an ATM network. On the connections 72030 and 71030 shown, the communications protocol used is the Internet Protocol.

The Internet Protocol IP can be used both on an ATM connection and on an Ethernet connection. On the basis of the ISO/OSI (Open Systems Interconnect) protocol standard, the upper layers of a communications protocol can be used on different media. Specifically, this standardized protocol comprises seven layers, with the bottommost layer being the physical layer, the second layer being the data link layer, the third layer being the network layer, the fourth layer being the transport layer, the fifth layer being the session layer, the sixth layer being the presentation layer and the seventh layer being the application layer. In the case of this layer protocol standardized on the basis of ISO IS8802, each layer uses the services of the layer below it. Messages, for example in the form of control messages, which are transmitted using this layer protocol thus progressively receive an additional information item per layer, which produces a data structure in which the original messages have seven layer-specific information elements added to them. Within the context of this communications protocol, any communications media and any layers can thus be coupled to one another.

The conversion devices U are necessary in order to match the different layer structures to one another. By way of example, the conversion device U20 converts ATM cell data into TDM data. These ATM cell data can then be forwarded directly as ATM cell data, for example in the local device DZ20 via the local switching center CS20 and via the connection element link 73020.

However, it is likewise possible to forward them to a conversion device U2030 which is in the form of an ATM/IP gateway, for example. There, ATM cell data are conditioned for the Internet Protocol and can then be forwarded via the connection elements 72030 to the local switching center CS30 for the local device DZ 30. The remarkable aspect of this configuration is thus that terminals on the local device DZ20 can communicate with terminals on the local device DZ30 using the Internet Protocol and can also be reached directly on the basis of the asynchronous transfer mode.

To be able to actuate the different connection element links 72030 and 73020, a central control device thus requires appropriate complementary control information for control messages for controlling connection setup between communications subscribers, said control information relating to the type of connection path and protocol-specific information, i.e. gateways to be used.

The conversion device U2030 in the local device DZ30 is in the form of an ATM/IP gateway, for example. The local switching center CS30 is, by way of example, an IP router or switch, while U30 is in the form of an TDM/IP gateway. Similarly, the local switching center CS10 for the local device DZ10 is in the form of an IP router/switch, while the conversion device U1030 is in the form of a TDM/IP gateway.

The local device DZ40 likewise contains a local switching center CS40 in the form of an ATM switching section connected to a conversion device U40 which converts TDM data into ATM cell data.

Additional information for the control mechanism about the reachability of the individual subscribers using particular gateways and about particular conversion devices and switching centers, and also the associated local devices thereof, is stored in a central control device's data store, for example.

This centrally stored information can either be distributed to the local units and can thus be the basis for a separate decision by the local units about communications protocols to be used and usable transport media when a connection is set up, or the decision is made in the central station and is communicated to the local device.

On the basis of the control information in this database, an appropriate number of control messages are produced for one or more respective connection elements, such as from DZ40 to DZ10, via the connection elements 72040 and 71030, said control messages being transmitted to the respective local switching centers in order to control connection setup, for example.

The connection variants shown here naturally represent only some of the technically possible variants of connection element links, communications media, communications protocols and conversion devices to which the invention can be applied without restriction, which cannot all be listed.

By way of example, it is likewise possible for local data stores to be provided in the area of local devices DZ, the stock of information in the data stores being limited to devices which are present in the respective local devices DZ. For the case of connection control, although the central control mechanism then needs to request this information first, such configurations have the advantage that local devices can also be serviced and maintained locally. There is also redundancy in the data storage and better availability of the communications devices, because the failure of a local data store does not affect the entire network.

By way of example, it is likewise possible for the area of local devices DZ to receive data from the central station whose stock of information is limited to the partner devices of local devices.

For the case of connection control, the local device can then make an independent decision about the use of the correct gateways.

A particular advantage of a communications arrangement as shown is that any infrastructures can be matched to one another, and that the specifically directed controllability of the connection element links and of the conversion devices required allows resource-saving connection setup in which unnecessary conversion steps for protocol or media alignment can be avoided in the best way.

Similarly, transport networks of any heterogeneity can be controlled by any central control device without complex technical developments in terms of alignment, because transport-network-specific call processing can advantageously be used which is based on information produced by a TDM-based control mechanism.

The specific way in which this can be done has already been described in the explanation of FIG. 4. The data storage required in such an arrangement can be limited to a minimum degree, because the transport-network-specific data additionally need to be stored. Similarly, such a communications device brings the advantages of a single private branch exchange to bear, such as the central availability of service features, the central administrability and a central application interface. Advantageously, a plurality of different, possibly already existing, network sections thus produce a standard communications system which has the outward appearance of a single installation but which can be flexibly matched to the technical requirements of the customer by virtue of the choice of conversion devices.

FIG. 6 shows a particularly advantageous communications arrangement with communications terminals KE10 to KE40 which are connected via an Ethernet and are controlled from a central device ZE 100 via a control network STN. In this case, the connection can be set up both via an Ethernet and via an ATM network, and/or using a hybrid configuration of the transport network. In this embodiment of an arrangement, the devices required for producing, for setting up, for clearing down and for sustaining communications links, which were also included in a local device DZ in the description for FIG. 5, have been incorporated in one communications terminal KE. The number and selection of available components per terminal depends on the type of communications protocols used and on the communications media which are available.

Such an arrangement provides the option of connecting telephone subscribers to TDM subscribers using the Internet Protocol. In this case, the central control mechanism carries out call processing for the TDM subscribers. As regards the IP telephone subscribers, the functionality of their devices needs to be extended, for example, so that they can provide the scope of functions standardized on the basis of ITU protocols H.323 and H.450. This can advantageously be done by virtue of the equipment-specific alignment modules DH being equipped with the functions of the H.323 and H.450 protocols for the purposes of actuating IP subscribers. This variant arrangement is particularly advantageous because telephony based on the Internet Protocol can easily be linked to TDM-based telephony. The development complexity for matching the central control device ZE100 to the communications terminals KE is minimal in this context and requires only the development of a specific software module DH.

The local switching centers for the communications terminals KE exist, by way of example, in the form of network driver cards for the Ethernet. A clear relationship between Internet addresses (IP addresses) and the connection features of a TDM connection can be produced by assigning an IP address precisely one local device having a subscriber line module and a subscriber line, for example, which device can in turn be reached via precisely one TDM data path. The local device, the subscriber line module, the subscriber line and the TDM data path are not physically present in this case, but rather are set up fictitiously in the software. This makes it possible to continue to use normal control with no great complexity of change. The changes are then for the most part limited to configuration data.

Figure 7:
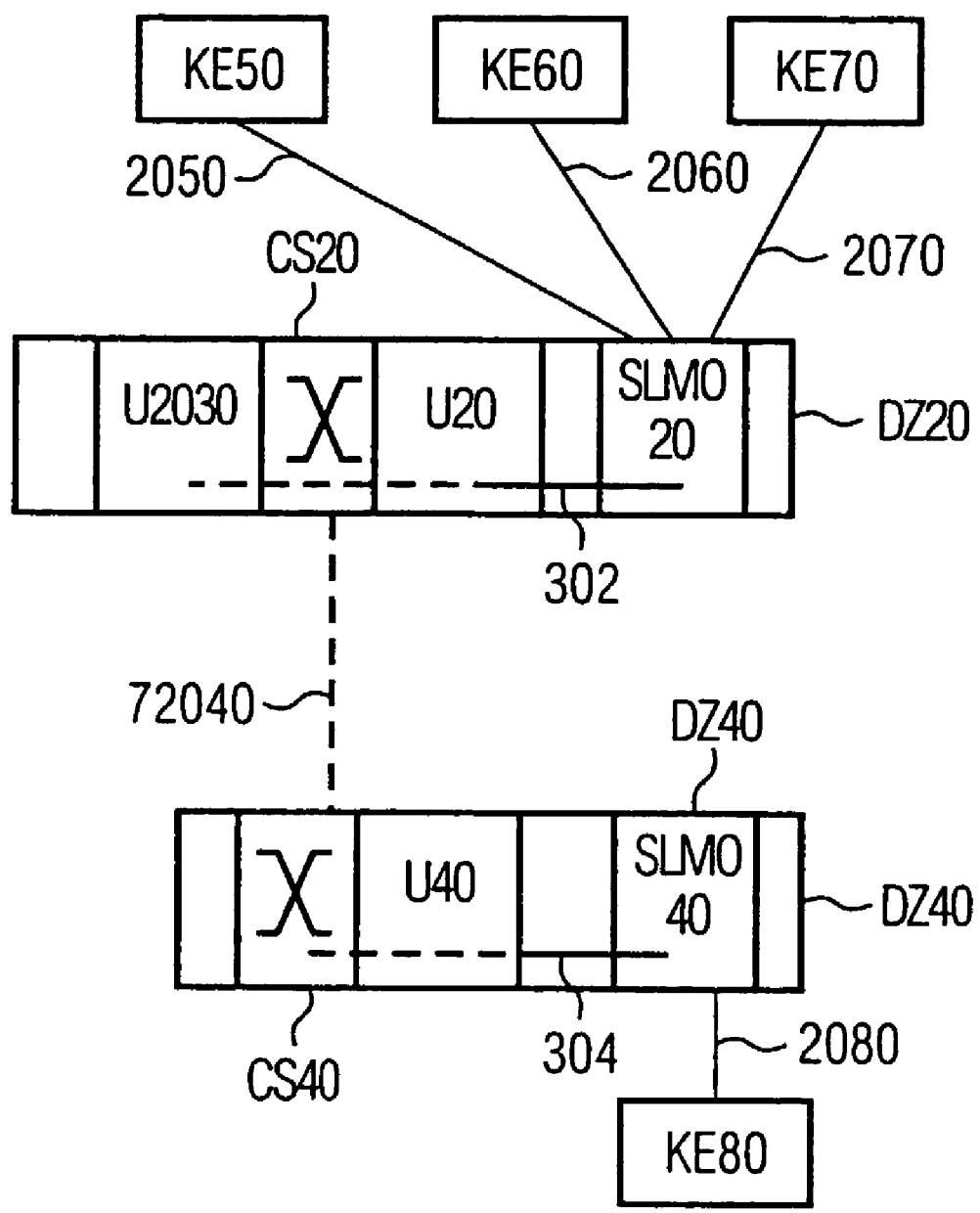
FIG. 7 shows another exemplary embodiment.

FIG. 7 shows a partial view of the illustration from FIG. 5 in order to explain an advantageous embodiment of a communications arrangement and a specific mode of operation of this arrangement. The reference symbols are used in a similar manner to in the other figures in this case. The fact that this illustration shows only two local devices DZ20 and DZ40 need not mean that such an embodiment of a communications arrangement can be limited to just two local devices. Instead, every local device in a communications arrangement can be equipped with the advantageous refinements which will be discussed below.

In contrast to the illustration in FIG. 5, this figure shows terminals KE50, KE60, KE70 and KE80. While the terminals KE50 to KE70 are connected by means of communication lines 2050 to 2070 to the local device DZ20 and, there, to the subscriber line module SLMD20, the communications terminal KE80 is connected by means of a connecting line 3080 to the module SLMD40 in the local device DZ40. As already explained above, these modules SLMD20 and SLMD40 communicate with the appropriate local switching centers CS20 and CS40 via TDM connections 304 and 302. As has already been described in this context, transport-network-specific call processing is normally carried out for an arrangement as described. This normal case arises, by way of example, when the communications terminal KE80 wishes to communicate via its connecting line 3080, the TDM data link 304, the conversion device U40, the local switching center CS40 and via a transport network link 72040 with one of the communications terminals KE50 to KE70 via the local switching center CS20, the conversion device U20 and the TDM data link 302 and via the subscriber line module SLMD20.

In the case of this specific embodiment, however, it is necessary to prevent a situation where, if communications terminals connected to the same subscriber line module or to the same local device DZ20 communicate with one another via the conversion device U20, because such communications terminals can be connected directly via the TDM data stream by switching their respective timeslots, and converting the TDM data into a transport-network-specific format ties up conversion capacity unnecessarily. Hence, suitable processing when handling a connection between the communications terminals KE50 to KE70 is intended to prevent communications data which are to be interchanged from needing to be converted into a transport-network-specific format, and then back again, using the conversion device U20. For the call processing in such an arrangement, timeslot-related information about the communications subscribers involved is required. As complementary information, information about the address of local devices to which these communications terminals are connected is additionally provided for specifically directed connection setup.

In an arrangement of the type illustrated in FIG. 7, the protocol-specific information analyzed is the address of the local device, and if the addresses of the local devices DZ involved and of the terminals to be connected are identical, i.e. terminals connected to the same local device DZ, conversion of the TDM data is prevented and a direct connection is produced between the terminals. This has the advantage that the conversion device, in this case U20, is available for other conversion procedures, that the transport network is not burdened by such procedures, no charges arise in the transport network and similarly the local switching center can perform other tasks. Hence, in this case, the handling of a connection involves the address of a local device for communications terminals KE affected thereby being checked in a respective local device DZ. Advantageously, if the result of this check is positive, a signal is output to an access chip for the TDM data stream, the task of which is to tap off the timeslots from the TDM data stream, or to pass them to the TDM data stream. Using this signal, this chip, for example, produces a short circuit such that the reading and writing directions of the communications terminals involved are interchanged with one another. This chip may possibly be in the form of a switching matrix.

The addresses can be checked both in the local device and in the central device. In the case of a central check, the local switching center is informed that a short circuit needs to be introduced.

What is claimed is:

1. A method for setting up and/or clearing down and sustaining a communications link, comprising:
    providing a communications link between at least two local devices in a transport network by local switching centers associated with the local devices;
    controlling the setup and/or clear-down of the communications link by a central control device via a control network;
    controlling the connection setup and/or clear-down in the transport network using at least two control information items;
    using a connection information item defining a timeslot connection via a switching matrix representing a first control information item; and
    providing a protocol information item representing a second control information item for the central control device and/or for the local devices to select communications protocols to be used and useable transport media.

2. The method as claimed in claim 1, in which the control information item is complemented by a media information item which relates to the transport network and identifies at least one transport network medium for the communications link.

3. The method as claimed in claim 1, wherein the communications link comprises at least two connection elements in the transport network, where each connection element uses at least one respective communications protocol whose layer structure differs in at least one layer and in which the control information item is complemented by an information item which identifies a conversion apparatus for the various communications protocols.

4. The method as claimed in claim 1, wherein the communications link comprises at least two connection elements in the transport network, where each connection element uses at least one respective communications protocol whose layer structure differs in at least one layer and in which the control information item is complemented by an information item which identifies a media access device for a respective communication medium.

5. The method as claimed in claim 1, in which an information item is provided centrally to complement the control information item in the area of the central control device.

6. The method as claimed in claims 4, in which an information item is provided locally to complement the control information item and is ascertained at least once by the central control device in the course of the handling of a communications link.

7. The method as claimed in claim 3, in which connection elements between local devices in the transport network use the Internet Protocol for transmission, and in which connection control is effected by assigning to an IP address one PCM data-stream subscriber line and a local device.

8. The method as claimed in claim 1, in which control information checks whether a connection setup via the transport network is necessary, and provides the connection elsewhere.

9. The method as claimed in claim 8, in which the control information item used is at least one address for a local device, and if the communications link relates to communications terminals which are connected to the same local device, a connection is set up without the communications data being converted on a transport-network-specific basis.

10. An apparatus for setting up and/or clearing down, and sustaining, a communications link, comprising:
a transport network to provide a communications link between at least two local devices of the transport network;
a control network to control the setup and/or clear-down of the communications link;
a central control device to control the connection setup and/or clear-down of the communications link via the control network, the central control device configured with a physical separation from the at least two local devices of the transport network, which output at least two control information items,
and in which at least two local devices of the transport network are configured to output and receive communications data; and
a switching center to provide a communications link in the transport network, where at least one connection element of the communications link is in the form of a connection which uses the Internet Protocol as communications protocol.

11. The apparatus as claimed in claim 10, in which the central control device is operatively connected to a second device to provide transport-network-specific protocol information and/or transport network media information.

12. The apparatus as claimed in claim 11, in which the second device is arranged centrally in the area of the central control device.

13. The apparatus as claimed in claim 11, in which the second device is arranged locally in the area of one of the local devices.

14. The apparatus as claimed in claim 10, in which a local device has at least one conversion device in the form of a gateway to convert a TDM protocol into an IP protocol.

15. The apparatus as claimed in claim 10, in which the local device has at least one network access device to an Ethernet, in the form of a transceiver.

16. The apparatus as claimed in claim 10, in which a local device has at least a first device to address evaluation of addresses for local devices which output a first signal when a communications link relates to a single central device.

17. The apparatus as claimed in claim 16, in which the first signal is output to a device to access timeslots in the TDM data stream from the local device, and the local device shorts the connection in the TDM data stream in response to the reception of the signal.

18. The apparatus as claimed in claim 17, in which the connection is shorted by interchanging the reading and writing directions.

19. The apparatus as claimed in claim 10, in which at least one of the local devices device is in the form of an integrated communications terminal.

20. The apparatus as claimed in claim 19, in which the integrated communications terminal is in the form of a telephone.

21. The apparatus as claimed in claim 19, in which the communications terminal is in the form of a personal computer.

* * * * *